(12) United States Patent
Imai et al.

(10) Patent No.: US 10,061,433 B2
(45) Date of Patent: Aug. 28, 2018

(54) TOUCH-TYPE INPUT DEVICE

(71) Applicants: KABUSHIKI KAISHA TOKAI RIKA DENKI SEISAKUSHO, Aichi (JP); SMK CORPORATION, Tokyo (JP)

(72) Inventors: Takao Imai, Aichi (JP); Yuji Takai, Aichi (JP); Osamu Yoshikawa, Tokyo (JP)

(73) Assignees: KABUSHIKI KAISHA TOKAI RIKA DENKI SEISAKUSHO, Tokyo (JP); SMK CORPORATION, Tokyo (JP)

( * ) Notice: Subject to any disclaimer, the term of this patent is extended or adjusted under 35 U.S.C. 154(b) by 14 days.

(21) Appl. No.: 15/315,580

(22) PCT Filed: Jun. 17, 2015

(86) PCT No.: PCT/JP2015/067437
§ 371 (c)(1),
(2) Date: Dec. 1, 2016

(87) PCT Pub. No.: WO2015/198936
PCT Pub. Date: Dec. 30, 2015

(65) Prior Publication Data
US 2017/0075482 A1   Mar. 16, 2017

(30) Foreign Application Priority Data

Jun. 26, 2014 (JP) .................. 2014-131712

(51) Int. Cl.
*G06F 3/041* (2006.01)
*G06F 3/044* (2006.01)
(Continued)

(52) U.S. Cl.
CPC ............ *G06F 3/0416* (2013.01); *B60K 37/02* (2013.01); *B60K 37/06* (2013.01); *G06F 3/041* (2013.01);
(Continued)

(58) Field of Classification Search
CPC ........ G06F 3/0416; G06F 3/041; B60K 37/02
See application file for complete search history.

(56) References Cited

U.S. PATENT DOCUMENTS

2007/0242053 A1* 10/2007 Muranaka ............... G06F 3/044
345/173
2011/0122096 A1* 5/2011 Kim ...................... G06F 3/0412
345/175
(Continued)

FOREIGN PATENT DOCUMENTS

| JP | 2010-009321 | 1/2010 |
| JP | 2013-012159 | 1/2013 |
| JP | 2013-097510 | 5/2013 |

OTHER PUBLICATIONS

International Preliminary Report on Patentability issued in International Patent Application No. PCT/JP2015/067437, dated Dec. 27, 2016.
(Continued)

*Primary Examiner* — Nicholas Lee
*Assistant Examiner* — Robert Stone
(74) *Attorney, Agent, or Firm* — Greenblum & Bernstein, P.L.C.

(57) ABSTRACT

A touch-type input device includes a touch panel in which drive electrodes and sensor electrodes are arranged in a grid pattern that provide capacitors. The touch-type input device also includes a controller that determines whether or not there is a touch based on data values that each indicate an amount of change in capacitance of each capacitor from a predetermined reference value. The controller sets the reference value by obtaining a parasitic capacitance of each capacitor when the touch-type input device is activated. When determining from a variation range of the parasitic
(Continued)

capacitances of the capacitors that an erroneous reference value has been obtained, the controller re-obtains a parasitic capacitance.

3 Claims, 10 Drawing Sheets

(51) Int. Cl.
  *B60K 37/02* (2006.01)
  *B60K 37/06* (2006.01)
(52) U.S. Cl.
  CPC ...... *G06F 3/044* (2013.01); *B60K 2350/1028* (2013.01); *B60K 2350/925* (2013.01)

(56) References Cited

U.S. PATENT DOCUMENTS

| | | | |
|---|---|---|---|
| 2011/0141047 A1 | 6/2011 | Iwaizumi et al. | |
| 2012/0249470 A1* | 10/2012 | Sugiura | G06F 1/1643 345/174 |
| 2013/0176268 A1* | 7/2013 | Li | G06F 3/044 345/174 |
| 2013/0207935 A1* | 8/2013 | Toda | G06F 3/0418 345/174 |
| 2013/0257786 A1* | 10/2013 | Brown | G06F 3/044 345/174 |
| 2014/0043287 A1* | 2/2014 | Nakajima | G06F 3/044 345/174 |
| 2014/0062947 A1* | 3/2014 | Zhou | G06F 3/0418 345/174 |
| 2014/0092033 A1* | 4/2014 | Chang | G06F 3/0418 345/173 |
| 2014/0139478 A1* | 5/2014 | Lee | G06F 3/044 345/174 |
| 2014/0160038 A1* | 6/2014 | Lee | G06F 3/044 345/173 |
| 2015/0002459 A1* | 1/2015 | Watanabe | G06F 3/0418 345/174 |
| 2015/0077388 A1* | 3/2015 | Liao | G06F 3/044 345/174 |
| 2015/0242007 A1 | 8/2015 | Iwaizumi et al. | |
| 2015/0268782 A1* | 9/2015 | Kim | G06F 3/044 345/174 |
| 2015/0379913 A1* | 12/2015 | Imai | G06F 3/0416 345/174 |
| 2015/0379914 A1* | 12/2015 | Imai | G09G 3/20 345/204 |

OTHER PUBLICATIONS

Search Report issued in International Patent Application No. PCT/JP2015/067437, dated Aug. 4, 2015.

* cited by examiner

TOUCH-TYPE INPUT DEVICE

TECHNICAL FIELD

The present invention relates to a touch-type input device that detects touching.

BACKGROUND ART

In a touch-type input device known in the art, a touch panel is touched to operate a mouse pointer or the like on a display (refer to, for example, patent document 1). In such a touch-type input device, a user touches an operation surface of the touch panel to select, for example, one of a plurality of functional items from the display and show a desired screen or activate an accessory device. Further, recent touch-type input devices detect, as touching, not only simple touching of the operation surface but also, for example, swiping or flicking of the operation surface of a touch panel with a finger in a certain direction. The swiping and flicking are associated with particular functions such as scrolling of the screen on a display.

Such a touch-type input device may be of a projected capacitive type that includes drive electrodes and sensor electrodes arranged in a grid pattern to detect touching from the capacitance of each of the capacitors formed at the intersections of the drive electrodes and the sensor electrodes. The projected capacitive type includes a mutual capacitive type that detects changes in the capacitance of each capacitor. The mutual capacitive type has an advantage in that it is capable of simultaneously detecting multiple touch positions.

Patent Document 1: Japanese Laid-Open Patent Publication No. 2010-9321

SUMMARY OF THE INVENTION

The mutual capacitive touch-type input device is unable to determine the amount of change in capacitance when wear and the influence of the ambient environment such as the temperature change the parasitic capacitance of each capacitor. Thus, when the touch-type input device is activated, a reference value for detecting the amount of change in capacitance is obtained for each capacitor, and each reference value is updated in accordance with changes in parasitic capacitance. However, when the touch-type input device is activated, an object contacting the device or the existence of external noise will change the parasitic capacitance from an original value. Accordingly, the touch-type input device may obtain an erroneous reference value and fail to correctly detect touching.

It is an object of the present invention to provide a touch-type input device that is capable of correctly detecting touching even when obtaining an erroneous reference value during activation of the touch-type input device.

According to one aspect of the present invention, a touch-type input device includes a touch panel. The touch panel includes a sensor array and an operation surface. The sensor array includes drive electrodes and sensor electrodes overlapped with and insulated from the drive electrodes. The drive electrodes and the sensor electrodes are arranged in a grid pattern that forms capacitors at intersections of the drive electrodes and the sensor electrodes. The touch-type input device further includes a controller that applies a drive signal to the drive electrodes to detect touching of the operation surface of the touch panel from changes in capacitance of each capacitor. The controller is configured to determine whether or not there is a touch based on data values that each indicate an amount of change in capacitance of each capacitor from a predetermined reference value, set the reference value by obtaining a parasitic capacitance of each capacitor when the touch-type input device is activated, and when determining from a variation range of the parasitic capacitances of the capacitors that an erroneous reference value has been obtained, re-obtain a parasitic capacitance.

The parasitic capacitance of each capacitor is a value specified by a product configuration. Thus, when an erroneous reference value is obtained, the variation range of the parasitic capacitances of the capacitors changes. In the above structure, when it is determined from the variation range that an erroneous reference value has been obtained, a parasitic capacitance is re-obtained. Accordingly, even if an erroneous reference value has been obtained as the parasitic capacitance changed, a correct reference value is subsequently obtained to correctly detect touching.

The touch-type input device of the present invention is capable of correctly detecting touching even when a parasitic capacitance changes.

DESCRIPTION OF THE EMBODIMENTS

First Embodiment

A first embodiment of a touch-type input device will now be described with reference to FIGS. 1 to 11.

Figure 1:
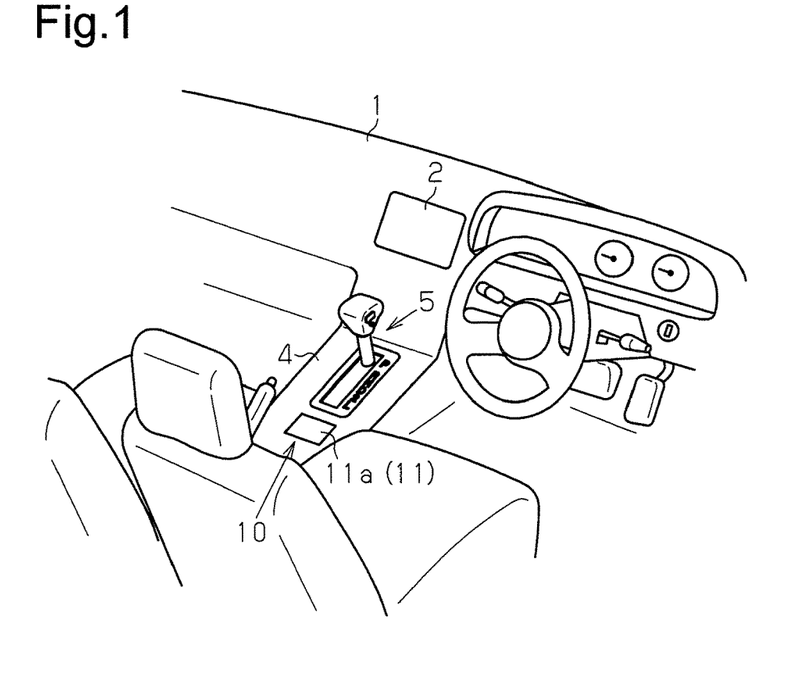
FIG. 1 is a perspective view illustrating a touch-type input device installed in a vehicle.

As illustrated in FIG. 1, a display 2 is arranged in a central portion (center cluster) of a dashboard 1. A shift lever 5 is arranged on a center console 4. A touch-type input device 10 includes a touch panel 11, which is embedded in the center console 4, for example, at the rear side of the shift lever 5. The touch panel 11 includes an operation surface 11a that is exposed to the outside. In the present embodiment, the touch-type input device 10 is installed in a vehicle but may be installed in other equipment. A user touches the touch panel 11 with a finger or a conductor such as a stylus to select or determine a desired functional item on the display 2 and perform a desired operation for an in-vehicle device such as an air-conditioner or a car navigation system. Touching includes not only simple touching of the operation surface 11a but also, for example, swiping and flicking of the operation surface 11a of the touch panel 11 with a finger in a certain direction.

Figure 2:
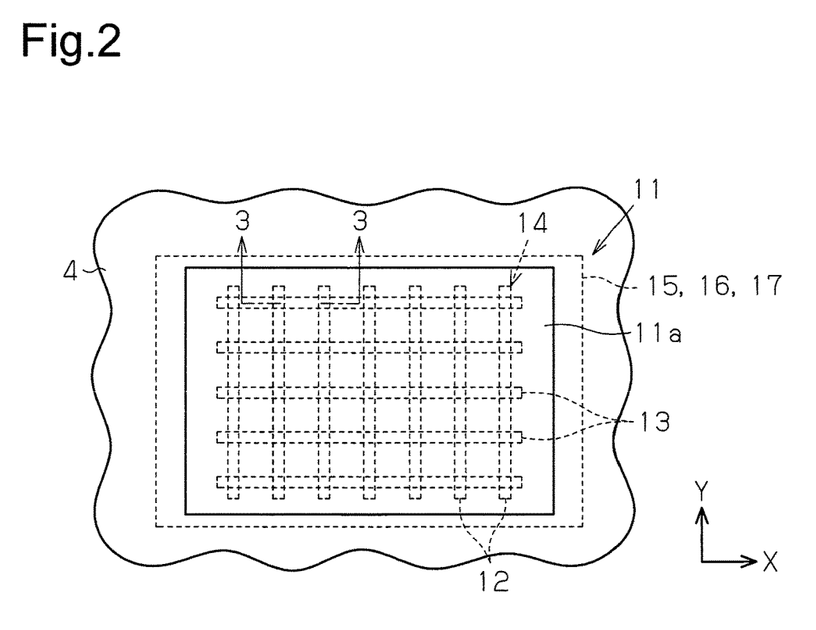
FIG. 2 is a plan view illustrating an operation surface of a touch panel of the touch-type input device and the vicinity of the operation surface.
Figure 3:
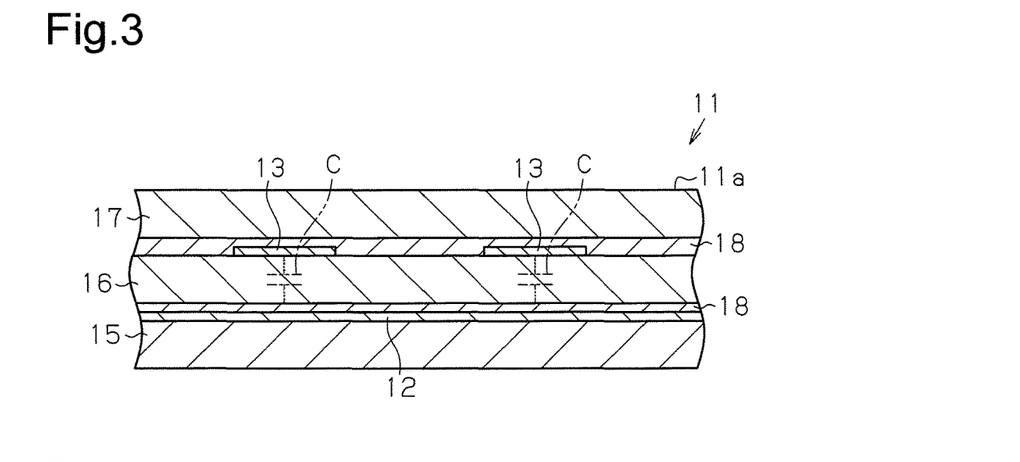
FIG. 3 is a cross-sectional view of the touch panel taken along line 3-3 in FIG. 2.

As illustrated in FIGS. 2 and 3, the touch panel 11 includes a sensor array 14. The sensor array 14 includes drive electrodes 12 and sensor electrodes 13 overlapped with and insulated from the drive electrodes 12. The drive electrodes 12 and the sensor electrodes 13 are arranged in a grid pattern that forms capacitors C (refer to FIG. 3) at the intersections of the drive electrodes 12 and the sensor electrodes 13. To facilitate understanding, only seven drive electrodes 12 and five sensor electrodes 13 are illustrated in FIG. 2.

As illustrated in FIG. 3, the drive electrodes 12 are arranged on a drive substrate 15, and the sensor electrodes 13 are arranged on a sensor substrate 16 that is located on the drive substrate 15. A cover 17 is arranged on the sensor substrate 16. The drive substrate 15, the sensor substrate 16, and the cover 17 are each formed from an insulative material. The operation surface 11a of the touch panel 11 is formed by part of the upper surface of the cover 17.

The drive electrodes 12 and the sensor electrodes 13 are each formed from a strip of conductive material. The drive electrodes 12 are arranged in a first direction (X direction) parallel to one another on the drive substrate 15 within a range corresponding to the operation surface 11a. The sensor electrodes 13 are arranged in a second direction (Y direction), which is orthogonal to the first direction, and are parallel to one another on the sensor substrate 16 within a range corresponding to the operation surface 11a. Thus, the drive electrodes 12 and the sensor electrodes 13 form the sensor array 14 having a grid pattern in the operation surface 11a. Further, as illustrated by the broken lines in FIG. 3, the drive electrodes 12 and the sensor electrodes 13 form the capacitors C at the intersections of the drive electrodes 12 and the sensor electrodes 13. In the present embodiment, the drive electrodes 12 and the sensor electrodes 13 are respectively fixed to the drive substrate 15 and the sensor substrate 16 by adhesives 18.

Figure 4:
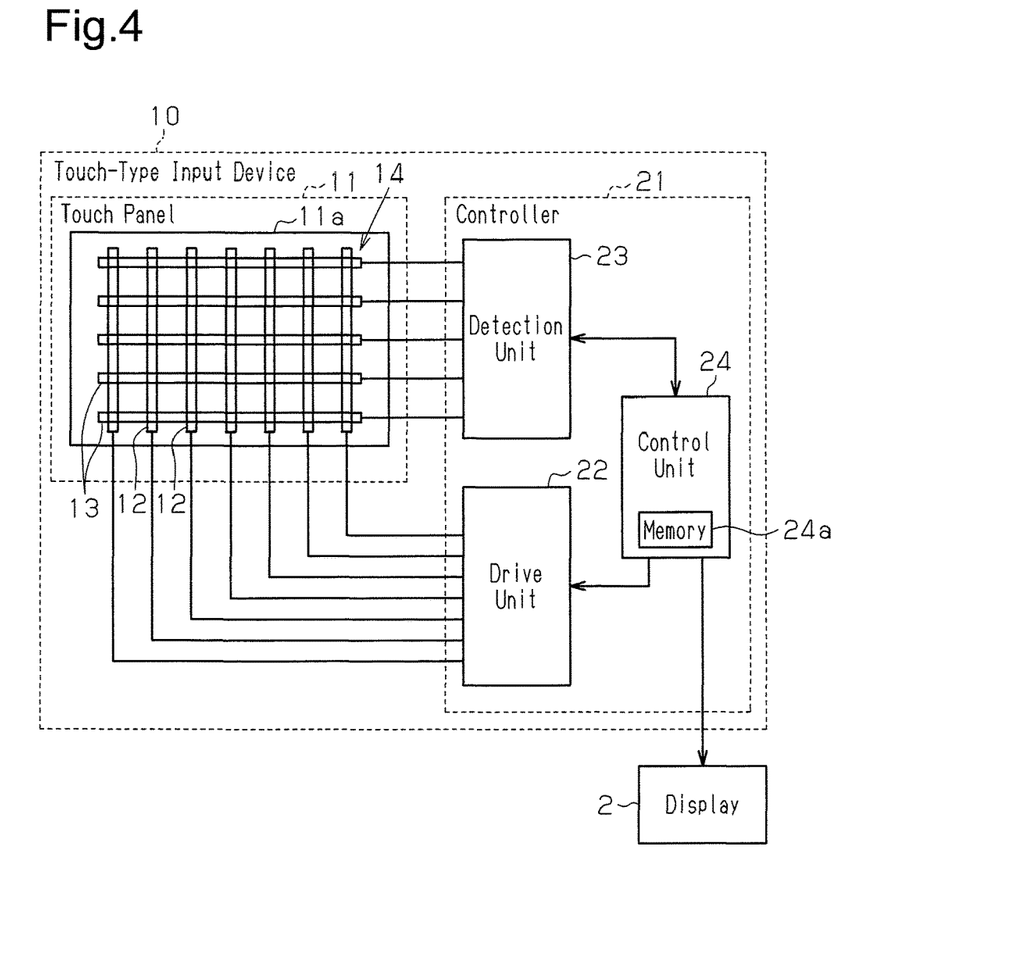
FIG. 4 is a block diagram illustrating the schematic configuration of the touch-type input device.

As illustrated in FIG. 4, the touch-type input device 10 further includes a controller 21 that applies a drive signal (pulse signal) to the sensor array 14 to detect touching of the operation surface 11a. The controller 21 of the present embodiment uses a mutual capacitance type that detects a touch position based on charging and discharging current generated when the capacitance of each capacitor C changes.

The controller 21 includes a drive unit 22 connected to the drive electrodes 12, a detection unit 23 connected to the sensor electrodes 13, and a control unit 24 that controls the drive unit 22 and the detection unit 23. The drive unit 22 selects the drive electrodes 12 at least one at a time in response to a control signal from the control unit 24 and applies a drive signal to the selected drive electrode 12. The detection unit 23 selects the sensor electrodes 13 at least one at a time in response to a control signal from the control unit 24 and receives charging and discharging current flowing to the sensor electrodes 13 as an output signal in accordance with the drive signal applied to the selected drive electrode 12. Further, the detection unit 23 detects the capacitance of each capacitor C based on the output signal output from each sensor electrode 13 and outputs a detection signal that indicates the capacitance of each capacitor C to the control unit 24. The control unit 24 detects touching and a touch position (coordinate) based on the detection signal and outputs the detection result to the display 2.

Figure 10A:
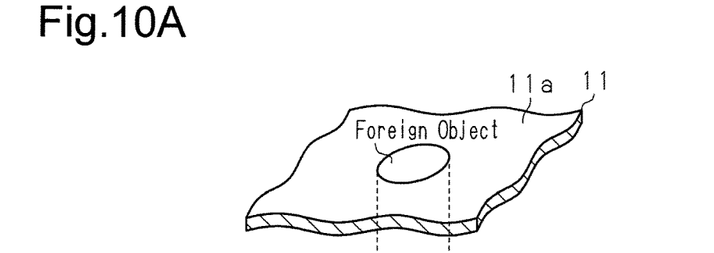
FIG. 10A is a schematic view illustrating a touch panel when a conductive foreign object is in contact with the operation surface of the touch-type input device.
Figure 10B:
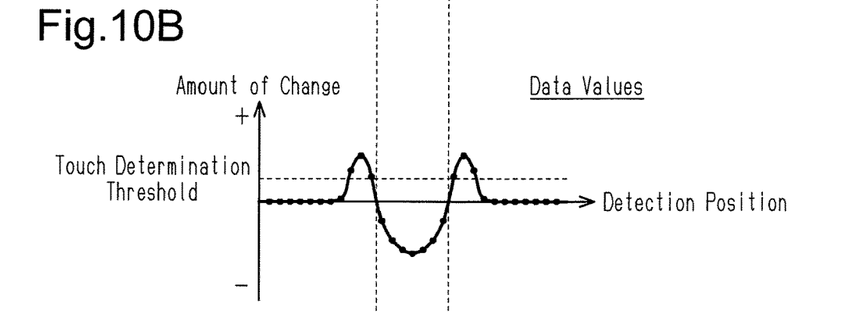
FIG. 10B is a graph that plots data values in the state of FIG. 10A.
Figure 11A:
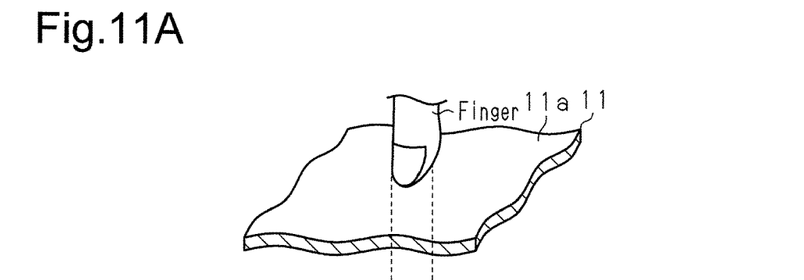
FIG. 11A is a schematic view illustrating a touch panel when a finger is in contact with the operation surface of the touch-type input device.
Figure 11B:
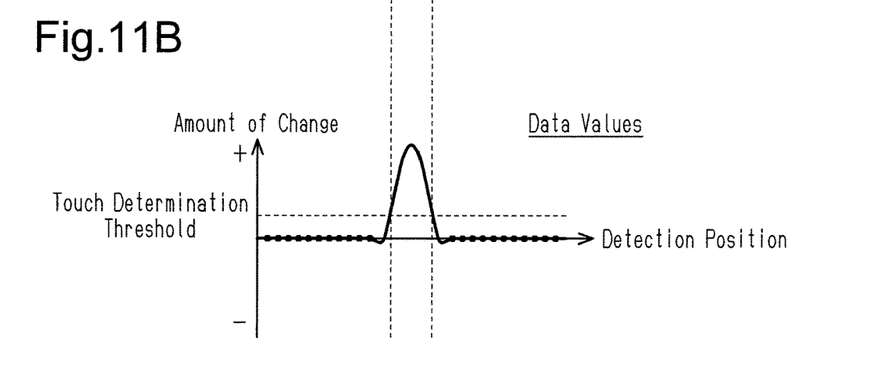
FIG. 11B is a graph that plots data values in the state of FIG. 11A.

The control unit 24 determines whether or not there is a touch by detecting the amount of change in capacitance from a predetermined reference value set for each capacitor C. In the present embodiment, when a conductive foreign object is in contact with the operation surface 11a of the touch panel 11 as illustrated in FIG. 10A, the capacitance changes to a negative polarity as illustrated in FIG. 10B. Further, when a finger or the like is in contact with the operation surface 11a of the touch panel 11 as illustrated in FIG. 11A, the capacitance changes to a positive polarity as illustrated in FIG. 11B.

As illustrated in FIG. 4, the control unit 24 includes a memory 24a. The memory 24a stores a predetermined reference value set for each capacitor C. Wear and the influence of the ambient environment such as the temperature change the parasitic capacitance of the capacitor C. Thus, the control unit 24 obtains the parasitic capacitance of each capacitor C when activated to set the reference value to a value conforming to the current parasitic capacitance.

However, when activated, an object contacting the touch panel 11 or the existence of external noise will change the parasitic capacitance from an original value. Accordingly, the touch-type input device may obtain an erroneous reference value and fail to correctly detect touching. Thus, if the control unit 24 determines that an erroneous reference value has been obtained from a variation range of the capacitance (parasitic capacitance) of the capacitor C detected when activated, the control unit 24 re-obtains the parasitic capacitance of the capacitor C.

When receiving detection signals from the detection unit 23, the control unit 24 determines whether or not there is a touch from data values that each indicate the amount of change in the capacitance of each capacitor C from the corresponding reference value. For example, the control unit 24 determines that touching has been performed when at least one of the data values becomes larger than or equal to a touch determination threshold that is set to a predetermined positive value.

The transition of the touch-type input device 10 between different states will now be described with reference to FIG. 5.

Figure 5:
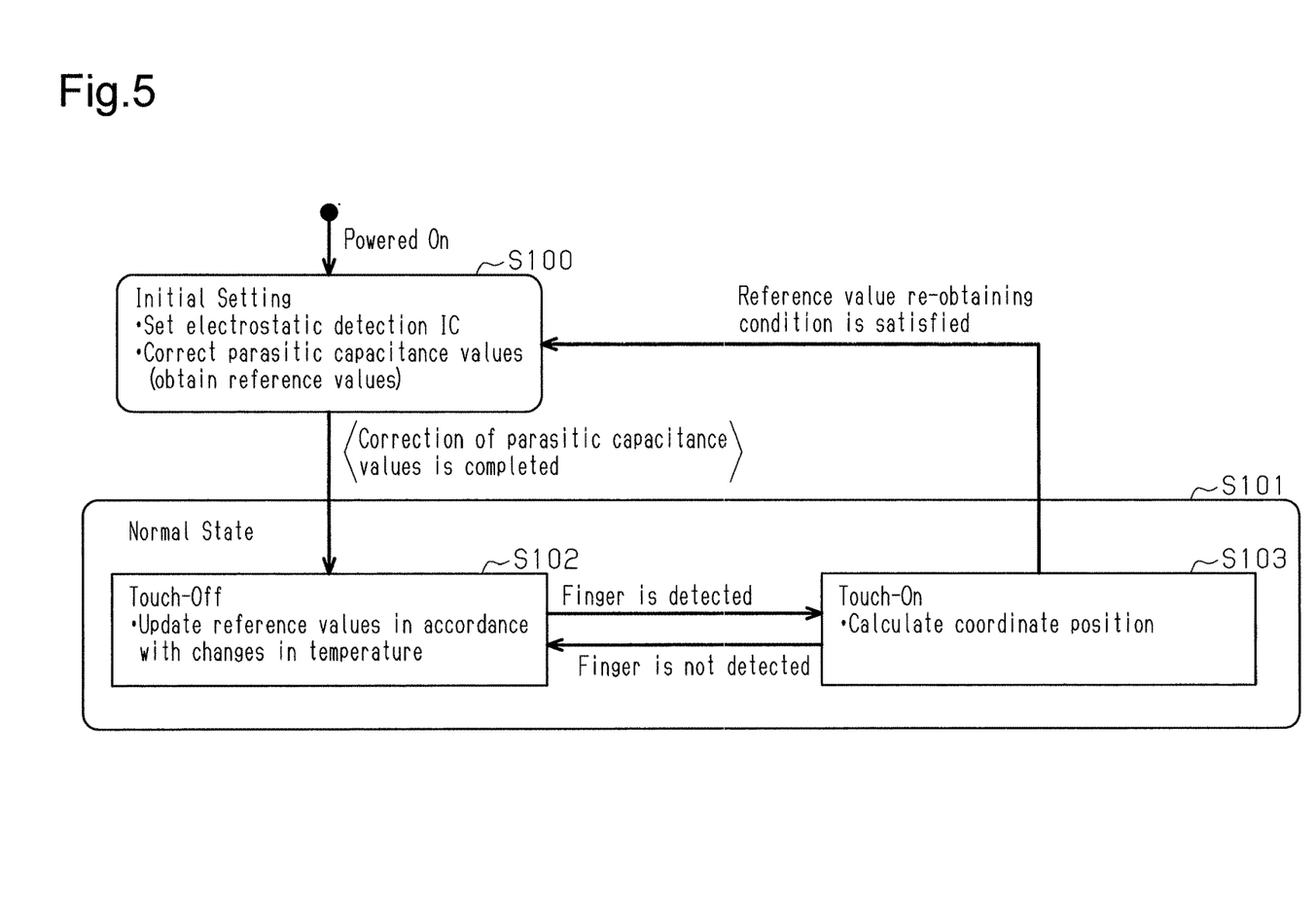
FIG. 5 is a diagram illustrating the transition of the touch-type input device between different states.

As illustrated in FIG. 5, when the touch-type input device 10 is powered on and the controller 21 is activated, the controller 21 shifts to an initial setting state (step S100). The initial setting sets an electrostatic detection IC and corrects parasitic capacitance values. That is, the control unit 24 of the controller 21 obtains, as the reference value of each capacitor, the current capacitance corresponding to changes in each parasitic capacitance value. After obtaining the reference values, the control unit 24 shifts to a normal state (step S101) in which touching is detected.

In a touch-off state (step S102) in which touching is not performed, the reference value is varied by changes in the temperature.

Accordingly, the control unit 24 updates the reference values in accordance with changes in the temperature in the touch-off state (step S102). That is, since the parasitic capacitance of the capacitor C is varied by changes in the temperature, the control unit 24 changes each reference value to a new value corresponding to the present temperature. Further, in the touch-off state (step S102), when the control unit 24 determines from the data values that there is a touch (i.e., finger detection), the control unit 24 shifts to a touch-on state (step S103). In the touch-on state (step S103), the control unit 24 calculates the positions (coordinates) where touching was performed and outputs the touch position to the display 2.

In the initial setting state (step S100), when setting the reference values, the control unit 24 checks a variation range of parasitic capacitances from detection values obtained from sensors of the capacitors C. When determining based on the variation range that an erroneous reference value has been obtained, the control unit 24 re-obtains the parasitic capacitance (that is, reference value) of each capacitor. In the present embodiment, when the variation range of the detection values of the sensors is larger than a predetermined specific range, the control unit 24 determines that an erroneous reference value has been obtained. When the variation range of the detection values of the sensors is smaller than or equal to the predetermined specific range, the control unit 24 determines that a correct reference value has been obtained.

A reference re-obtaining condition satisfaction determination process performed by the control unit 24 will now be described with reference to FIG. 6. The control unit 24 determines whether or not a reference value needs to be re-obtained in the initial setting state (step S100).

Figure 6:
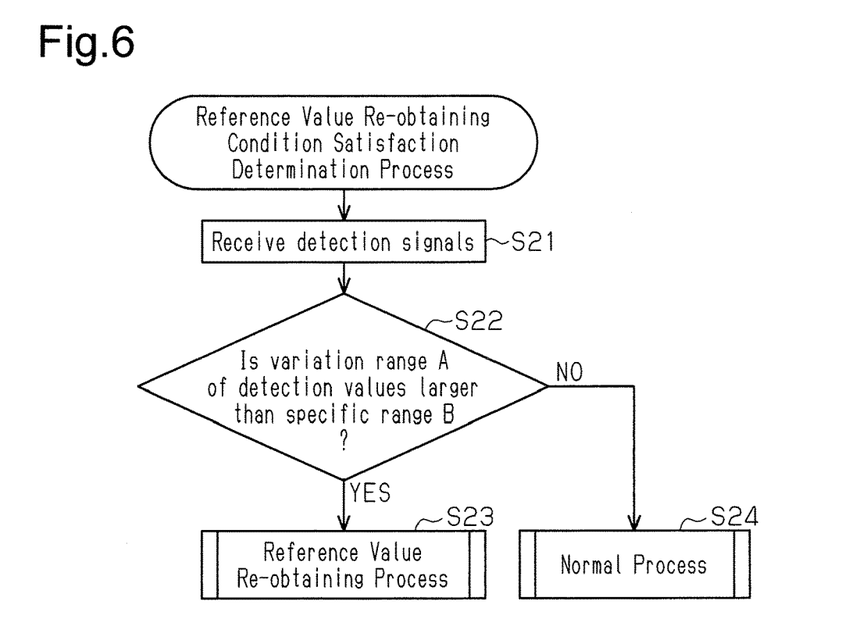
FIG. 6 is a flowchart illustrating a reference value re-obtaining condition satisfaction determination process in a first embodiment of the touch-type input device.
Figure 8:
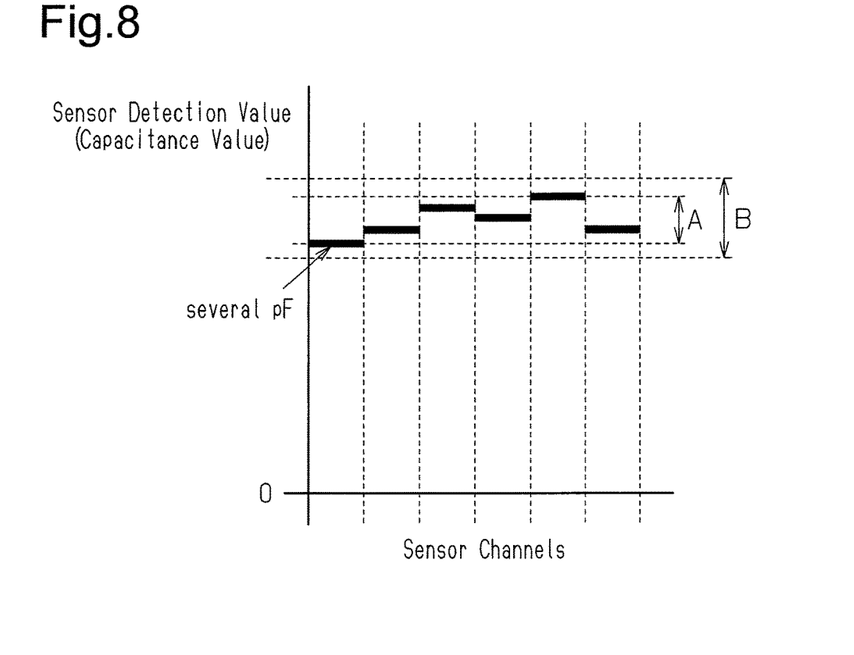
FIG. 8 is a graph illustrating a variation range of a sensor detection value when the touch-type input device is normal.
Figure 9:
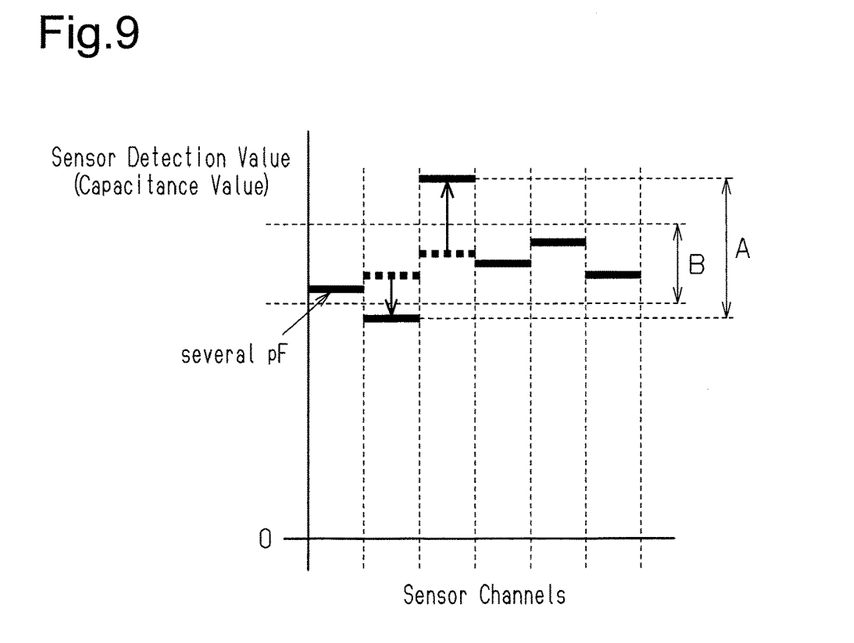
FIG. 9 is a graph illustrating a variation range of a sensor detection value when a reference value re-obtaining condition is satisfied in the touch-type input device in the first embodiment.

As illustrated in FIG. 6, when receiving a detection signal from the detection unit 23 (step S21), the control unit 24 determines whether or not a variation range A of detection values is larger than a specific range B (step S22). As illustrated in FIG. 8, the control unit 24 determines the variation range A based on the difference between the maximum value and the minimum value of data values (detection values) obtained from the sensors and determines whether or not the variation range A is larger than the specific range B. The specific range B is slightly larger than the variation range A of the reference values obtained when initially set in a factory or the like. As illustrated in FIG. 9, if a user performs touching when the reference values are being obtained, the detection value corresponding to the capacitor C where the touching was performed becomes a large positive value that is out of the specific range B. If a conductive foreign object is on the operation surface 11a when the reference values are being obtained, the detection value corresponding to the capacitor C where the conductive foreign object was located becomes a large negative value that is out of the specific range B. If external noise exists when the reference values are being obtained, the detection value corresponding to the capacitor C that received the external noise may become a large positive or negative value. Thus, the existence of external noise may also result in the variation range A of the detection values being larger than the specific range B.

Referring to FIG. 6, when the control unit 24 determines that the variation range A of the detection values is within the specific range B (detection result illustrated in FIG. 8) (step S22: NO), the control unit 24 shifts to a normal process (step S24). In the normal process, touching is detected in the normal state (step S101).

Further, when determining that the variation range A of the detection values is larger than the specific range B (detection result illustrated in FIG. 9) (step S22: YES), the control unit 24 determines that a reference value is likely to be erroneous and shifts to a reference value re-obtaining process (step S23). In the reference value re-obtaining process, the reference values are reset based on newly received detection signals. In the reference re-obtaining condition satisfaction determination process of the present embodiment, the variation range of detection values of the entire sensors is checked so that it can be easily determined whether or not the reference values are erroneous from the minimum value and the maximum value of the detection values of the sensors.

A reference value re-obtaining process performed by the control unit 24 will now be described with reference to FIG. 7.

Figure 7:
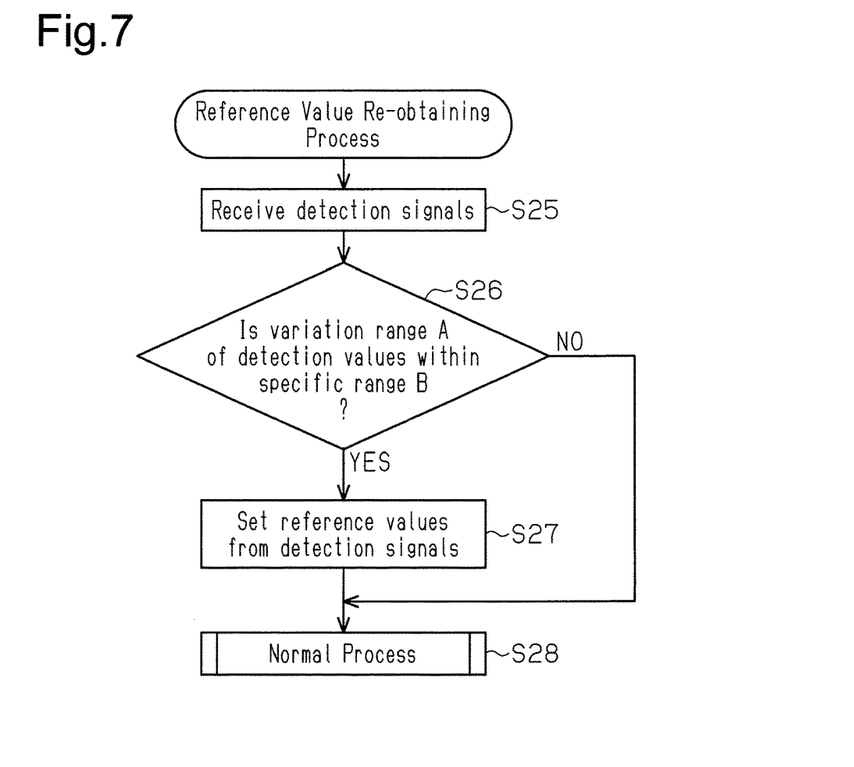
FIG. 7 is a flowchart illustrating a reference value re-obtaining process of the touch-type input device.

Referring to FIG. 7, when receiving a detection signal from the detection unit 23 (step S25), the control unit 24 determines whether or not the variation range A of the detection values is within the specific range B (step S26). That is, as illustrated in FIG. 8, the control unit 24 determines the variation range A from the difference between the maximum value and the minimum value of the data values obtained from the sensors and determines whether or not the variation range A is within the specific range B.

When determining that the variation range A of a detection value is not within the specific range B (detection result illustrated in FIG. 9) (step S26: NO), the control unit 24 shifts to the normal process (step S28). In this case, the control unit 24 determines that an erroneous reference value may be included and performs the normal process without setting the reference values.

When determining that the variation range A of the detection values is within the specific range B (detection result illustrated in FIG. 8) (step S26: YES), the control unit 24 sets a reference value from the detection signal (step S27) and then shifts to the normal process (step S28). That is, the control unit 24 determines that an erroneous reference value is not included and sets the reference value obtained in step S25 to a new reference value to perform the normal process.

In such a manner, the touch-type input device 10 of the present embodiment obtains the capacitance (parasitic capacitance) when activated and updates the reference value in accordance with changes in the capacitance (parasitic capacitance) caused by temperature changes, wear, and the like. That is, the control unit 24 determines whether or not the variation range A of the detection values is larger than the specific range B (step S22). When the variation range A of the detection value is larger than the specific range B, the control unit 24 re-obtains a reference value (step S23) to obtain the correct reference value. This allows for correct detection of touching.

As described above, the first embodiment has the following advantages.

(1) If an erroneous reference value is obtained when the touch-type input device 10 is activated, the variation range of the parasitic capacitances obtained from the sensors of the capacitors C changes. The variation range of the parasitic capacitances allows for determination that an erroneous reference value has been obtained. Since the correct reference value is re-obtained, touching is correctly detected even when the parasitic capacitance changes.

(2) If a parasitic capacitance is obtained when external noise or a foreign object exists, the parasitic capacitance of the capacitor C has been greatly changed. Thus, the variation range A of the parasitic capacitance of the capacitors C is larger than the specific range B. In such a case, it is determined that an erroneous reference value has been obtained.

Second Embodiment

A second embodiment of the touch-type input device 10 will now be described with reference to FIGS. 12 to 15. The touch-type input device 10 of the second embodiment has a reference value re-obtaining satisfaction condition that differs from the first embodiment. The following description focuses on the differences from the first embodiment.

A reference value re-obtaining satisfaction condition determination process performed by the control unit 24 will now be described with reference to FIG. 12.

Figure 12:
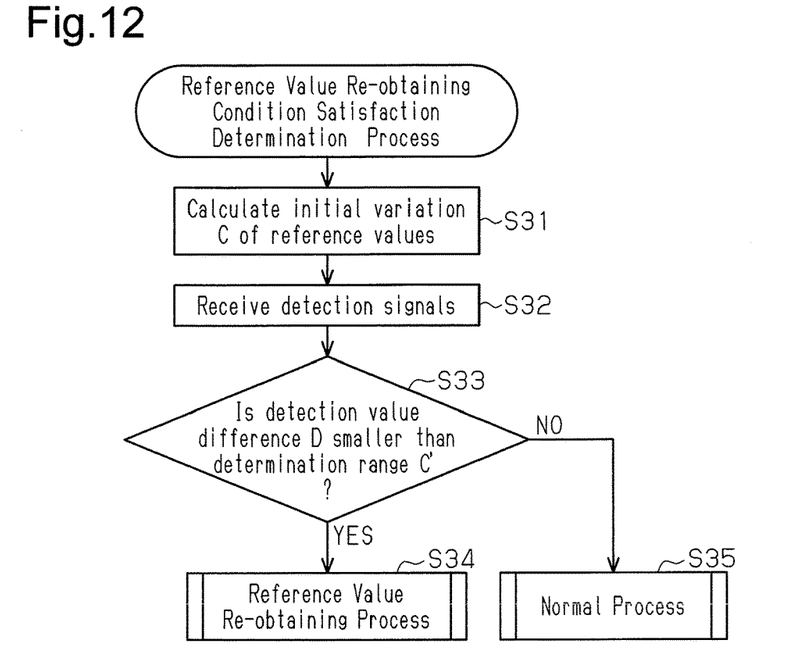
FIG. 12 is a flowchart illustrating a reference value re-obtaining condition satisfaction determination process in a second embodiment of a touch-type input device.
Figure 14:
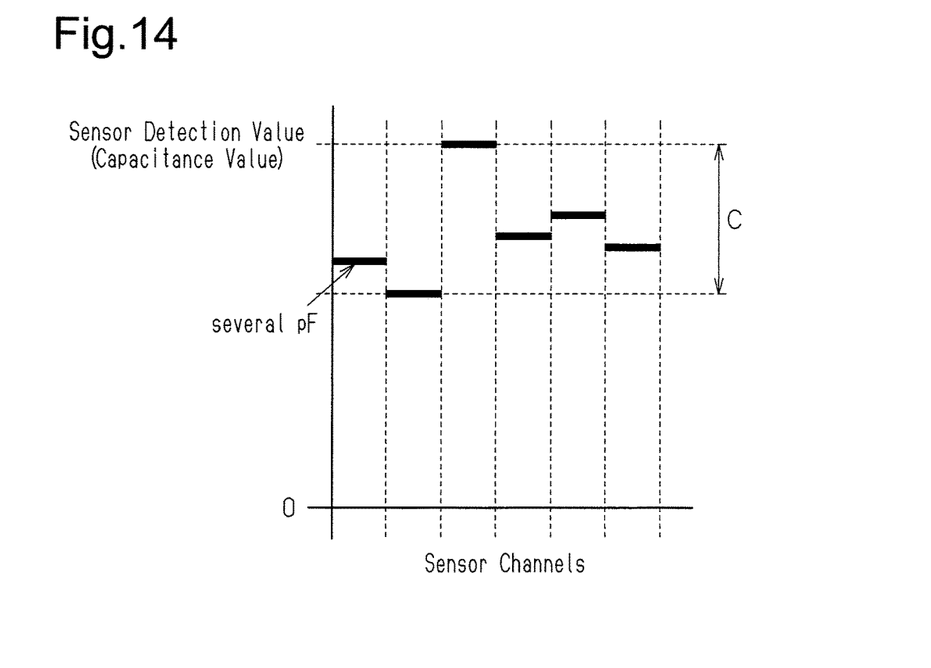
FIG. 14 is a graph illustrating an initial variation range of a sensor detection value of the touch-type input device.
Figure 15:
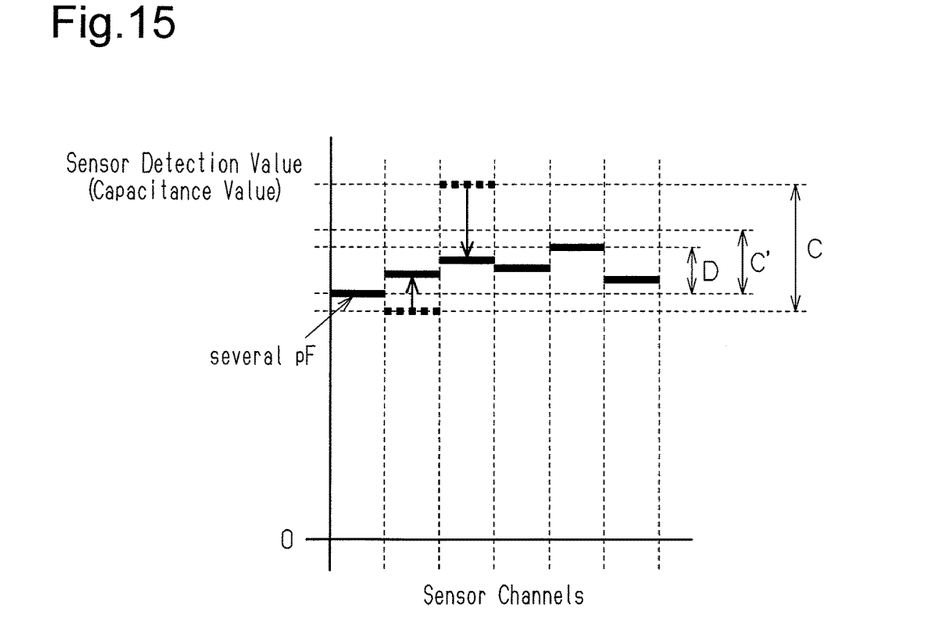
FIG. 15 is a graph illustrating a variation range of a sensor detection value when a reference value re-obtaining condition is satisfied in the touch-type input device in the second embodiment.

As illustrated in FIG. 12, the control unit 24 obtains the reference values to calculate an initial variation range C of the reference values (step S31). When receiving a detection signal from the detection unit 23 (step S32), the control unit 24 determines whether or not a detection value difference D is smaller than a determination range C' (step S33). That is, the control unit 24 sets a variation range D as the difference between the maximum value and the minimum value of data values (detection values) of the sensors and determines whether or not the variation range D is smaller than the determination range C'. Referring to FIG. 14, the initial variation range C corresponds to a first specific range and is the difference between the maximum value and the minimum value of the reference values initially set when the touch-type input device 10 is activated. Further, the determination range C' corresponds to a second specific range that is obtained by multiplying the initial variation range C by a predetermined proportion. For example, the predetermined proportion is 50%. In the example of FIG. 14, the initial variation range C is large. In such a case, when the reference values were obtained, the user may have been performing touching, external noise may have existed, or a conductive foreign object may have been on the operation surface 11a. Referring to FIG. 15, the detection value difference D is smaller than the determination range C' if new reference values were obtained when a user was not performing touching, when external noise did not exist, and when a conductive foreign object was not on the operation surface 11a.

As illustrated in FIG. 12, when determining that the detection value difference D is larger than or equal to the determination range C' (step S33: NO), the control unit 24 shifts to the normal process (step S34). In the normal process, touching is detected in the normal state (step S101).

Further, when the control unit 24 determines that the detection value difference D is smaller than the determination range C' (detection result as illustrated in FIG. 15) (step S33: YES), the reference value is likely to be erroneous. More specifically, the difference D is likely to be smaller than the determination range C' after a foreign object or the like is removed. Thus, the control unit 24 shifts to a reference value re-obtaining process (step S34). In the reference value re-obtaining condition satisfaction determination process, the variation range of the detection values of the entire sensors is checked. Thus, it is easily determined whether or not the reference value is erroneous from the minimum value and the maximum value of the detection values of the sensors.

The reference value re-obtaining process performed by the control unit 24 will now be described with reference to FIG. 13.

Figure 13:
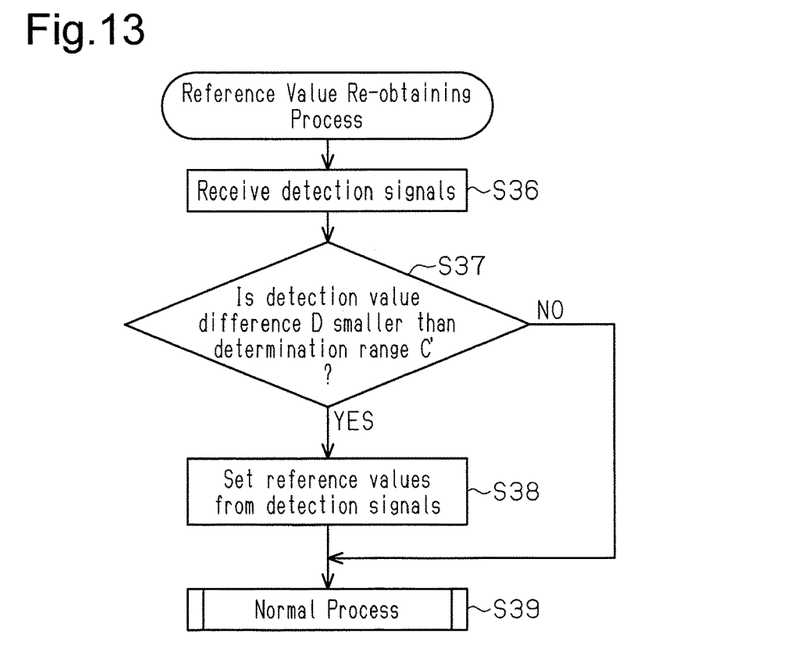
FIG. 13 is a flowchart illustrating a reference value re-obtaining process of the touch-type input device.

As illustrated in FIG. 13, when receiving a detection signal from the detection unit 23 (step S36), the control unit 24 determines whether or not the detection value difference D is smaller than the determination range C' (step S37).

When determining that the detection value difference D is larger than or equal to the determination range C' (step S37: NO), the control unit 24 shifts to the normal process (step S39). In this case, the control unit 24 determines that an erroneous reference value may be included and performs the normal process without setting reference values.

When determining that the detection value difference D is smaller than the determination range C' (detection result as illustrated in FIG. 15) (step S37: YES), the control unit 24 sets a reference value from the detection signal and shifts to the normal process (step S39). That is, the control unit 24 determines that an erroneous reference value is not included and sets the reference value obtained in step S36 as a new reference value to perform the normal process.

Thus, in the same manner as the touch-type input device 10 of the first embodiment, the touch-type input device 10 of the second embodiment obtains a correct reference value and correctly detects touching.

As described above, the second embodiment has the following advantage in addition to advantage (1) of the first embodiment.

(3) If a reference value is obtained when a conductive foreign object is on the operation surface 11a, when the operation surface 11a is touched, or when external noise exists, the initial variation range C becomes large. Subsequently, when the reference values are obtained after the foreign object is removed from the operation surface 11a, the variation range (difference D) of parasitic capacitances of the capacitors C become smaller than the determination range C' that is set to be smaller than the initial variation range C. Accordingly, even when an erroneous reference value is obtained, the correct reference value is subsequently obtained.

Third Embodiment

A second embodiment of the touch-type input device 10 will now be described with reference to FIGS. 16 to 19. The touch-type input device 10 of the third embodiment has a reference value re-obtaining satisfaction condition that differs from the first embodiment. The following description focuses on the differences from the first embodiment.

A reference value re-obtaining satisfaction condition determination process performed by the control unit 24 will now be described with reference to FIG. 16.

Figure 16:
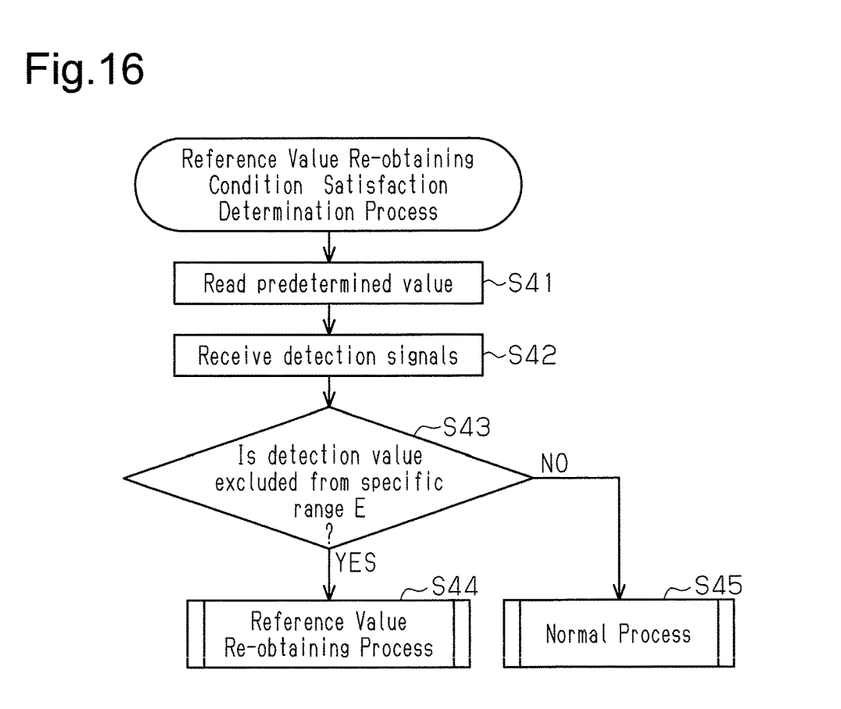
FIG. 16 is a flowchart illustrating a reference value re-obtaining condition satisfaction determination process in a third embodiment of a touch-type input device.
Figure 18:
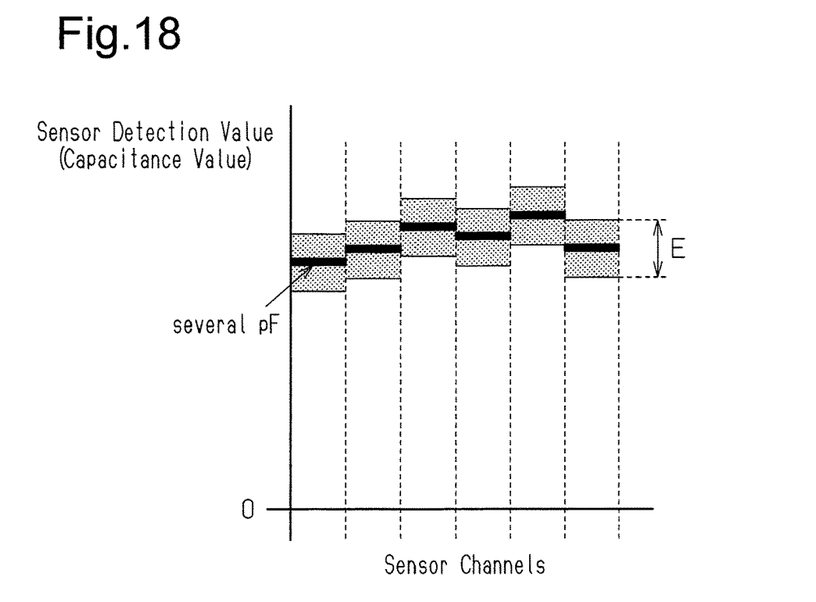
FIG. 18 is a graph illustrating an initial variation range of a sensor detection value of the touch-type input device.
Figure 19:
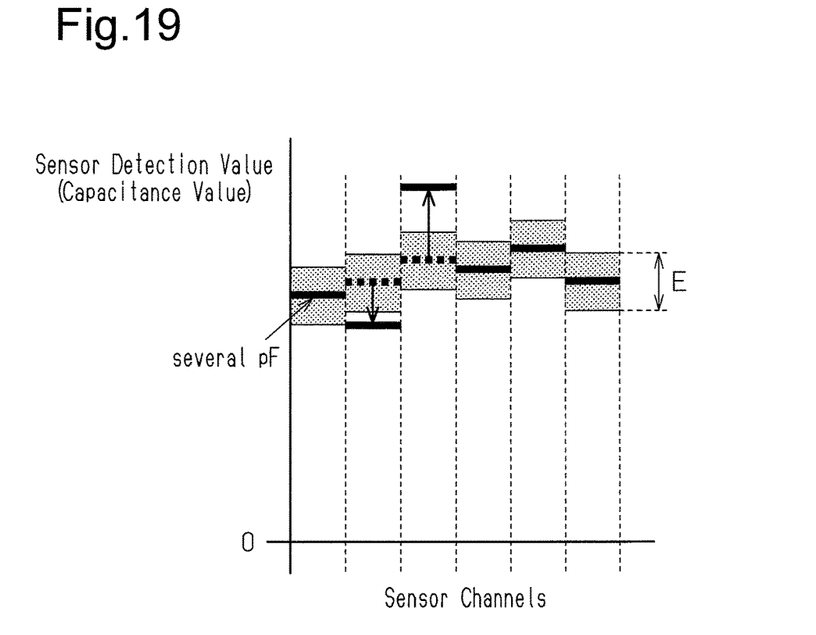
FIG. 19 is a graph illustrating a variation range of a sensor detection value when a reference value re-obtaining condition is satisfied in the touch-type input device in the third embodiment.

As illustrated in FIG. 16, the control unit 24 reads a specific value that indicates a specific range E of each detection value (step S41). When receiving a detection signal from the detection unit 23 (step S42), the control unit 24 determines whether or not the detection value is excluded from the specific range E (step S43). That is, as illustrated in FIG. 18, the control unit 24 determines whether or not each of data values (detection values) of the sensors is excluded from the specific range E. The specific range E is a tolerable range that indicates the tolerable variation amount of the reference values obtained when the value is initially set in a factory or the like. As illustrated in FIG. 19, if a user performs touching, external noise exists, or a foreign object is on the operation surface 11a when obtaining the reference values, the detection value is excluded from the specific range E.

As illustrated in FIG. 16, when determining that each detection value is excluded from the specific range B (detection result as illustrated in FIG. 18) (step S43: NO), the control unit 24 shifts to the normal process (step S45). In the normal process, touching is detected in the normal state (step S101).

Further, when the control unit 24 determines that at least one detection value is excluded from the specific range E (detection result as illustrated in FIG. 19) (step S43: YES), the reference value is likely to be erroneous. Thus, the control unit 24 shifts to the reference value re-obtaining process (step S44). In such a manner, in the reference value re-obtaining condition satisfaction process of the third embodiment, the variation range of the parasitic capacitance of each sensor is checked to correctly determine abnormality of each sensor.

Figure 17:
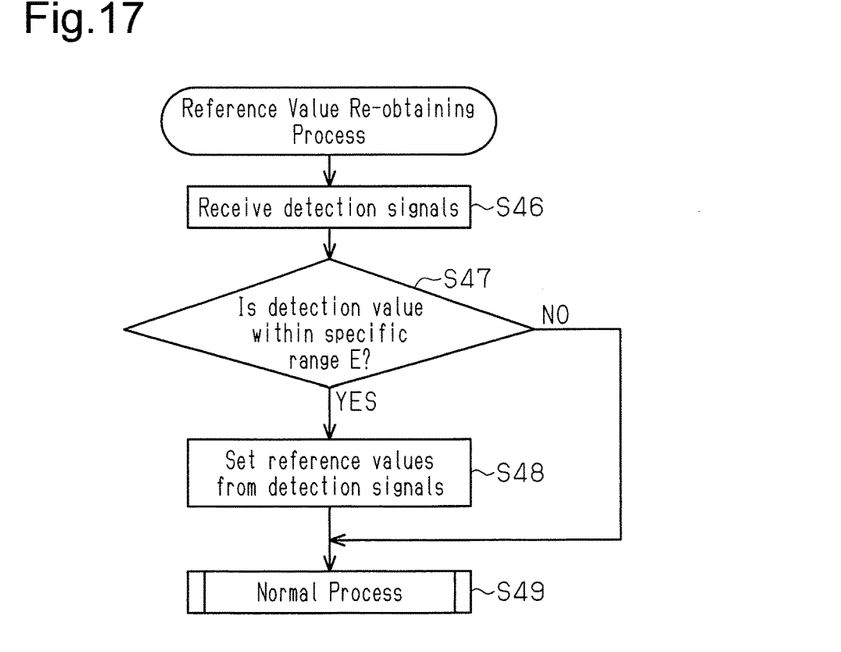
FIG. 17 is a flowchart illustrating a reference value re-obtaining process of the touch-type input device.

The reference value re-obtaining process performed by the control unit 24 will now be described with reference to FIG. 17.

When receiving a detection signal from the detection unit 23 (step S46), the control unit 24 determines whether or not each detection value is within the specific range E (step S47). That is, referring to FIG. 18, the control unit 24 determines whether or not each of data values obtained from the sensors is excluded from the specific range E.

When determining that at least one of the detection values is excluded from the specific range B (detection result illustrated in FIG. 19) (step S47: NO), the control unit 24 shifts to the normal process (step S49). In this case, when determining that an erroneous reference value is likely to be included, the control unit 24 performs the normal process without setting a reference value.

When determining that each detection value is within the specific range E (detection result illustrated in FIG. 18) (step S47: YES), the control unit 24 sets the reference value from the detection signal (step S48) and then shifts to the normal process (step S49). That is, the control unit 24 determines that an erroneous reference value is not included and sets the reference value obtained in step S46 to a new reference value and then performs the normal process.

Thus, in the same manner as the touch-type input device 10 of the first embodiment, the touch-type input device 10 of the third embodiment obtains correct reference values and correctly detects touching.

As described above, the third embodiment has the following advantage in addition to advantage (1) of the first embodiment.

(4) If a parasitic capacitance is obtained when external noise or a foreign object exists, the parasitic capacitance of the capacitor C has been greatly changed. Thus, the parasitic capacitance of the affected capacitor C is larger than the specific range E. In such a manner, it is determined that an erroneous reference value is obtained.

The above embodiments may be modified as follows.

In the above embodiments, the sensors may be divided in any manner, for example, lines or areas.

In the above embodiments, the specific range B, the initial variation range C, and the specific range E are set based on reference values obtained when initially setting new values in a factory or the like. Instead, the reference values may be obtained when a dealer or a user performs a specific operation.

The invention claimed is:

1. A touch-type input device comprising:
a touch panel including a sensor array and an operation surface, wherein the sensor array includes drive electrodes and sensor electrodes overlapped with and insulated from the drive electrodes, and the drive electrodes and the sensor electrodes are arranged in a grid pattern that forms capacitors at intersections of the drive electrodes and the sensor electrodes; and
a controller that applies a drive signal to the drive electrodes to detect touching of the operation surface of the touch panel from changes in capacitance of each capacitor, wherein
the controller is configured to:
determine whether or not there is a touch based on data values that each indicate an amount of change in capacitance of each capacitor from a predetermined reference value;
obtain initial reference values for the capacitors by detecting a parasitic capacitance of each capacitor when the touch-type input device is activated, wherein the controller determines an initial variation range from a difference between a maximum value and a minimum value of the initial references values and sets a determination range having a smaller range than the initial variation range by multiplying the initial variation range by a predetermined proportion;
re-obtain new reference values for the capacitors by detecting a parasitic capacitance of each capacitor again after the touch-type input device is activated and determine a current variation range from a difference between a maximum value and a minimum value of the new references values;
prior to determining whether or not there is a touch, determining whether or not the initial reference values are erroneous by determining whether or not the current variation range is smaller than the determination range; and
when the current variation range is smaller than the determination range, determine that the initial reference values are erroneous and use the new reference values to determine whether or not there is a touch.

2. The touch-type input device according to claim 1, wherein the controller is further configured to determine that the initial reference values are erroneous when determining that the initial variation range is larger than a predetermined specific range.

3. The touch-type input device according to claim 1, wherein the controller is further configured to determine that the initial reference values are erroneous when determining that at least one of the parasitic capacitances of the capacitors is larger than a predetermined specific range.

* * * * *

UNITED STATES PATENT AND TRADEMARK OFFICE
CERTIFICATE OF CORRECTION

PATENT NO. : 10,061,433 B2
APPLICATION NO. : 15/315580
DATED : August 28, 2018
INVENTOR(S) : T. Imai et al.

Page 1 of 1

It is certified that error appears in the above-identified patent and that said Letters Patent is hereby corrected as shown below:

On the Title Page

Assignees (Line 2), please change "Tokyo" to -- Aichi --.

Signed and Sealed this
Twenty-sixth Day of February, 2019

Andrei Iancu
*Director of the United States Patent and Trademark Office*